(12) United States Patent
Hermann

(10) Patent No.: US 6,310,408 B1
(45) Date of Patent: Oct. 30, 2001

(54) SYSTEM FOR TRANSMITTING DATA IN A MOTOR VEHICLE

(75) Inventor: Stefan Hermann, Köfering (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/499,565

(22) Filed: Feb. 7, 2000

Related U.S. Application Data

(63) Continuation of application No. PCT/DE98/02128, filed on Jul. 27, 1998.

(30) Foreign Application Priority Data

Aug. 5, 1997 (DE) .............................................. 197 33 866

(51) Int. Cl.[7] .............................................. H04M 11/00
(52) U.S. Cl. ................................... 307/10.1; 340/310.01; 701/36
(58) Field of Search ......................... 307/10.1; 320/161; 123/630, 644; 701/36; 340/310.01

(56) References Cited

U.S. PATENT DOCUMENTS

| | | | |
|---|---|---|---|
| 4,621,170 | 11/1986 | Picandet . | |
| 5,646,534 | * 7/1997 | Kopera | .................................. 324/434 |
| 5,736,831 | * 4/1998 | Harrington | .......................... 320/161 |
| 5,745,027 | 4/1998 | Malville . | |
| 5,775,310 | * 7/1998 | Ito et al. | ............................... 123/630 |
| 5,929,535 | * 7/1999 | Fendt et al. | ......................... 307/10.1 |

FOREIGN PATENT DOCUMENTS

| | | |
|---|---|---|
| 3811217A1 | 10/1989 | (DE) . |
| 4201468A1 | 7/1992 | (DE) . |
| 4227577C1 | 2/1994 | (DE) . |
| 19526809A1 | 1/1997 | (DE) . |
| 0384258A2 | 8/1990 | (EP) . |
| 0693401A2 | 1/1996 | (EP) . |

OTHER PUBLICATIONS

Published International Application No. 97/21565 (Swart et al.), dated Jun. 19, 1997.

* cited by examiner

*Primary Examiner*—Albert W. Paladini
(74) *Attorney, Agent, or Firm*—Herbert L. Lerner; Laurence A. Greenberg; Herbert H. Stemer

(57) ABSTRACT

The invention relates to a data transmission method and a data processing system for use in a motor vehicle, in which a satellite station is supplied with power by a central station via a data transmission line that is used jointly for the transmission of data and the supply of power. The quiescent voltage on the data transmission line is regulated with a current generator in the central station and is fed back with low-pass filter characteristics.

11 Claims, 2 Drawing Sheets

SYSTEM FOR TRANSMITTING DATA IN A MOTOR VEHICLE

CROSS-REFERENCE TO RELATED APPLICATION

This is a continuation of copending International Application PCT/DE98/02128, filed Jul. 27, 1998, which designated the United States.

BACKGROUND OF THE INVENTION

FIELD OF THE INVENTION

The invention lies in the automotive technology field. More specifically, the invention relates to a system for transmitting data between a satellite station and a central station in a motor vehicle.

In vehicle occupant protection systems in motor vehicles, for example air bag systems, seatbelt tensioning systems etc., one or more satellite stations, which are arranged for example in side regions of the motor vehicle and perform impact detection or early detection of accidents there, are provided in many cases in addition to a central station which performs impact detection. Such satellite stations transmit data to the central station when an impact or a situation where a risk of an accident is detected, with the result that the station can control suitable triggering measures. The satellite station can also be configured in such a way that it transmits messages (life signs) to the central station at regular intervals.

U.S. Pat. No. 5,712,784 (European application EP 0 693 401 A2) discloses a data transmission method in which the satellite stations are connected to the control unit of the central station via dedicated data lines. The necessary voltage supply to the satellite stations is not mentioned in any detail in that specification, but is usually provided via dedicated voltage supply lines. In the prior art method, the data are transmitted in the form of pulse-width-modulated signals which have a constant period and whose pulse duty factor represents information to be transmitted. The pules are applied directly to inputs of the central unit of the central station via the data lines. The expenditure on lines and wiring which is necessary for the transmission of data and the supply of voltage to the satellite stations is relatively high.

German published patent application DE 42 01 468 A1, upon which the instant invention is based, proposes a bus system with an integrated voltage supply for all the system subscribers, in particular for motor vehicles, in which all the bus system components are fed by a common, apparently unregulated voltage source. Each subscriber is provided with a current source which can be switched on and off. Switching them on and off enables current pulses to be generated in accordance with the data that are to be transmitted and which are fed onto the bus system.

German patent DE 42 27 577 C1 discloses a method for the bidirectional transmission of signals according to the master/slave principle. A line that connects the master and the slaves is used both for the transmission of signals and also to supply power to the slave modules. The master signal is voltage-encoded, whereas the slave signals are current-encoded. The master signal is transmitted continuously without interruption, even at times in which no data are being transmitted.

U.S. Pat. No. 4,621,170 discloses a data transmission device in which the supply voltage is made available by means of a battery. The data are superimposed in the form of current pulses which are generated by current sources which can be switched on and off.

SUMMARY OF THE INVENTION

The object of the invention is to provide a method of transmitting data between a satellite station and a central station in a motor vehicle which overcomes the above-noted deficiencies and disadvantages of the prior art devices and methods of this kind, and which permits a reliable transmission of data while reducing the expenditure on wiring necessary for the satellite station.

With the above and other objects in view there is provided, in accordance with the invention, a data transmission system in a motor vehicle, in particular within a vehicle occupant protection system (airbag, belt tensioner, etc.) comprising:

a central station, a satellite station, and a data transmission line connecting the satellite station to the central station for transmitting data between the two stations in the form of current pulses;

a current generator with low-pass filter characteristics feedback in the central station, the current generator having an output connected to the data transmission line for supplying power to the satellite station via the data transmission line;

a voltage amplifier for regulating the current generator, the voltage amplifier having an input connected to the data transmission line and receiving a voltage reference signal and an output coupled to a control input of the current generator.

In accordance with an added feature of the invention, there is provided a current generator in the satellite station or the central station for generating current pulses representing data to be transmitted. The data are superimposed in the form of current pulses on a quiescent voltage present on the data transmission line, preferably with a different sign.

In accordance with another feature of the invention, a window comparator is connected to the data transmission line for demodulating the data signal carried on the data transmission line.

In accordance with a further feature of the invention, a voltage regulator is provided in the satellite station, the voltage regulator having an input connected to the data transmission line and an output providing a supply voltage for the satellite station.

In accordance with again an added feature of the invention, a characteristic impedance termination connected at either end of the data transmission line. In a preferred embodiment, the characteristic impedance termination is a serial RC element.

In accordance with again an additional feature of the invention, a cutoff frequency of the low-pass control of the current generator is lower than a data transmission frequency by approximately one order of magnitude.

In accordance with a concomitant feature of the invention, the satellite station inputs the data to be transmitted into the data transmission line in encoded form, and the central station demodulates the data received from the data transmission line. In a preferred embodiment of the system, the data are transmitted in AMI-encoded pulses with positive and negative polarities.

In the system according to the invention, the data transmission line is used at the same time as a current supply line for the satellite station, with the result that no additional expenditure on lines and wiring has to be provided for this. The current supply to the supply station is provided by means of a fed-back current generator which is arranged in the central station and which is actuated by means of a regulator with low-pass filter characteristics. This ensures that the output resistance of the current generator is very high in the frequency range of the data signal which is to be transmitted, and the current generator therefore causes no distortion of the amplitude and/or phase of the transmitted data signal. As a result, a high level of data transmission quality is ensured. The current regulator is preferably embodied as a differential amplifier with voltage reference signal, with the result that the quiescent voltage on the data transmission line is kept essentially the same irrespective of the current consumption of the satellite station. Because the current generator and the voltage regulator which controls it have high impedance in comparison with the transmit data generation section of the satellite station in the frequency range which is relevant for the transmission, the data signals which are to be transmitted can simply be superposed on the quiescent voltage of the data transmission line in the form of current pulses. Owing to the high (output) resistance of the current generator, these current pulses give rise, even when they are of small magnitude, to voltage pulses which are strong and can thus easily be detected at the receiver end. These data signals can easily and reliably be demodulated at the receiver end (central station or satellite station) by means of a comparator or a window comparator.

The high impedance of the data transmission line in the high-frequency range, i.e. in the range of data transmission frequency and above, provides the further advantage that the data transmission line can easily be adapted, with the result that the reflections and resonances are avoided. This also ensures that the data signal excursion on the data transmission line is virtually undamped and is thus virtually immune to faults.

The invention also provides advantages in comparison with a proposal to provide a pure current interface between the central station and the satellite, in order to supply energy to the satellite station and transmit data to it, and to provide a current measuring circuit as data receiver in the central station. This is because, when a current interface is used with the central-station-end current measuring circuit, the large variance of the input resistance, of the line capacitances and also of the current consumption in the satellite station lead to a situation in which faults occur in the transmission of data at desired, relatively high data transmission speeds, with the result that these parameters have to be monitored closely and set tightly. There may also be the problem that the current consumption of the current interface depends on the signal shape of the transmitted data. These problems do not arise with the present invention.

This is because the circuit according to the invention acts as a voltage interface in the lower frequency range, and as a current interface with a high line connection resistance in the data transmission frequency range.

As noted above, the data are preferably transmitted in the form of current pulses to or from the central station on the data transmission line. AMI encoding (alternate mark inversion encoding) of the data stream is advantageous.

Other features which are considered as characteristic for the invention are set forth in the appended claims.

Although the invention is illustrated and described herein as embodied in a system for transmitting data in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
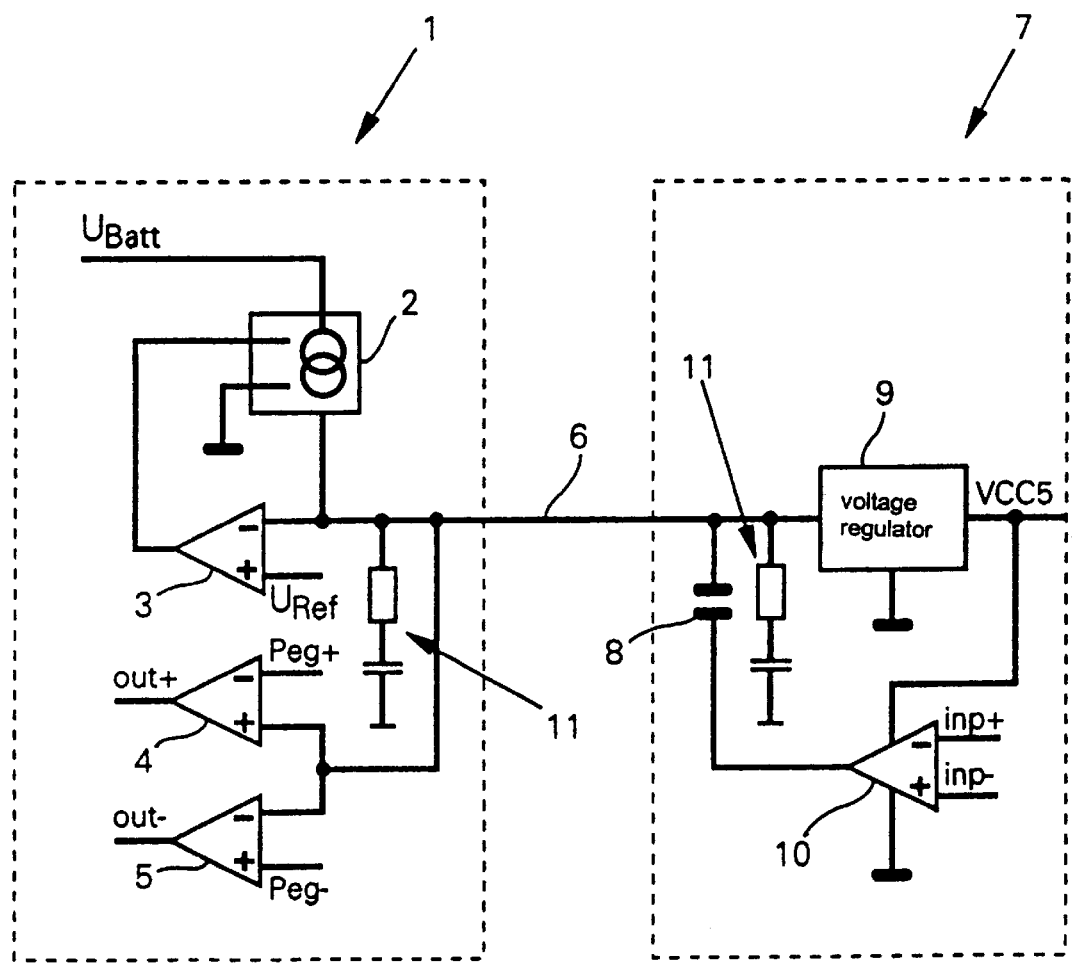
FIG. 1 is a schematic diagram of a central station connected to satellite station within a motor vehicle.

Referring now to the figures of the drawing in detail a central station 1 is connected to a satellite station 7 via a data transmission line 6. The central station 1 and the satellite station 7 form, possibly together with further satellite stations, a data processing system in a motor vehicle and preferably control a vehicle occupant protection system, for example an air bag system or a seatbelt pretensioning system. The components which are necessary for this in the central station, such as microprocessors, memories, output interfaces, and the like, are well known to those of skill in the pertinent art and they are, therefore, not illustrated in the drawing figures.

The central station 1 also has a regulated current generator 2. The generator 2 has an input at which it is supplied with battery voltage from the vehicle's electrical system and an output to the data transmission line 6. In the control loop of the current generator (current source) 2, a regulator 3 in the form of a differential amplifier is provided. One input (the inverting input "−") of the differential amplifier is connected to the transmission line and a voltage reference signal $U_{Ref}$ is applied to its non-inverting input (the "+" input). The differential amplifier 3 has low-pass filter characteristics, the cutoff frequency being significantly lower, preferably approximately an order of magnitude lower, than the data transmission rate on the data transmission line 6. This ensures that the voltage at the output of the current generator 2, and thus on the data transmission line 6, corresponds on average to the voltage of the voltage reference signal $U_{Ref}$, and that the output resistance of the current generator 2 together with the regulator is very high in the frequency range of the data signal which is to be transmitted.

The central station 1 also has a window comparator which is formed by two comparators (differential amplifiers) 4 and 5, an inverting or non-inverting input terminal of each of which is connected jointly to the data transmission line 6. A reference signal Peg+ is applied to the inverting input of the comparator 4, the level of which reference signal Peg+ is higher than the quiescent voltage of the data transmission line 6, but lower than the level of a positive data impulse. In contrast, the non-inverting input of the comparator 5 is fed with a reference voltage Peg− whose level is lower than the quiescent voltage of the data transmission line 6, but higher than the level of a negative data pulse (referred to the level of the quiescent voltage) occurring on the data transmission line. The window comparator 4, 5 thus permits the data which are transmitted on the data transmission line 6 to be demodulated, in particular even if they are AMI-encoded (AMI=alternate mark inversion). AMI-encoding is understood here to be a type of encoding in which every other positive pulse of a pulse train which is composed only of zeros (zero level) and ones (positive level) is inverted, with the result that a unipolar signal is converted into a bipolar signal with a diminishingly small d.c. element. In this form of transmission, the average voltage on the data transmission line 6 remains essentially unchanged even during the transmission of data because no additional d.c. voltage element is superimposed and the differential amplifier 3 cannot respond to the high data transmission frequency owing to its low-pass filter characteristics. As a result, the data transmission does not cause the current generator 2 to be adjusted, with the result that the average voltage on the data transmission line 6 (quiescent voltage) is not changed.

It is also possible to transmit the data in uncoded form, i.e. in the form of a pulse train of positive levels and zero levels. In this case, a single comparator 4 or 5 is adequate.

In the circuit illustrated in FIG. 1 with window comparator 4, 5, the comparator 4 generates a corresponding positive output pulse at each pulse which runs into the positive. In contrast, the comparator 5 generates a positive output pulse at each data pulse which runs into the negative. These output pulses which are output by the comparators 4, 5 are combined, for example, by means of an OR element at whose output the original pulse sequence which is present before the AMI encoding is thus generated again.

Figure 2:
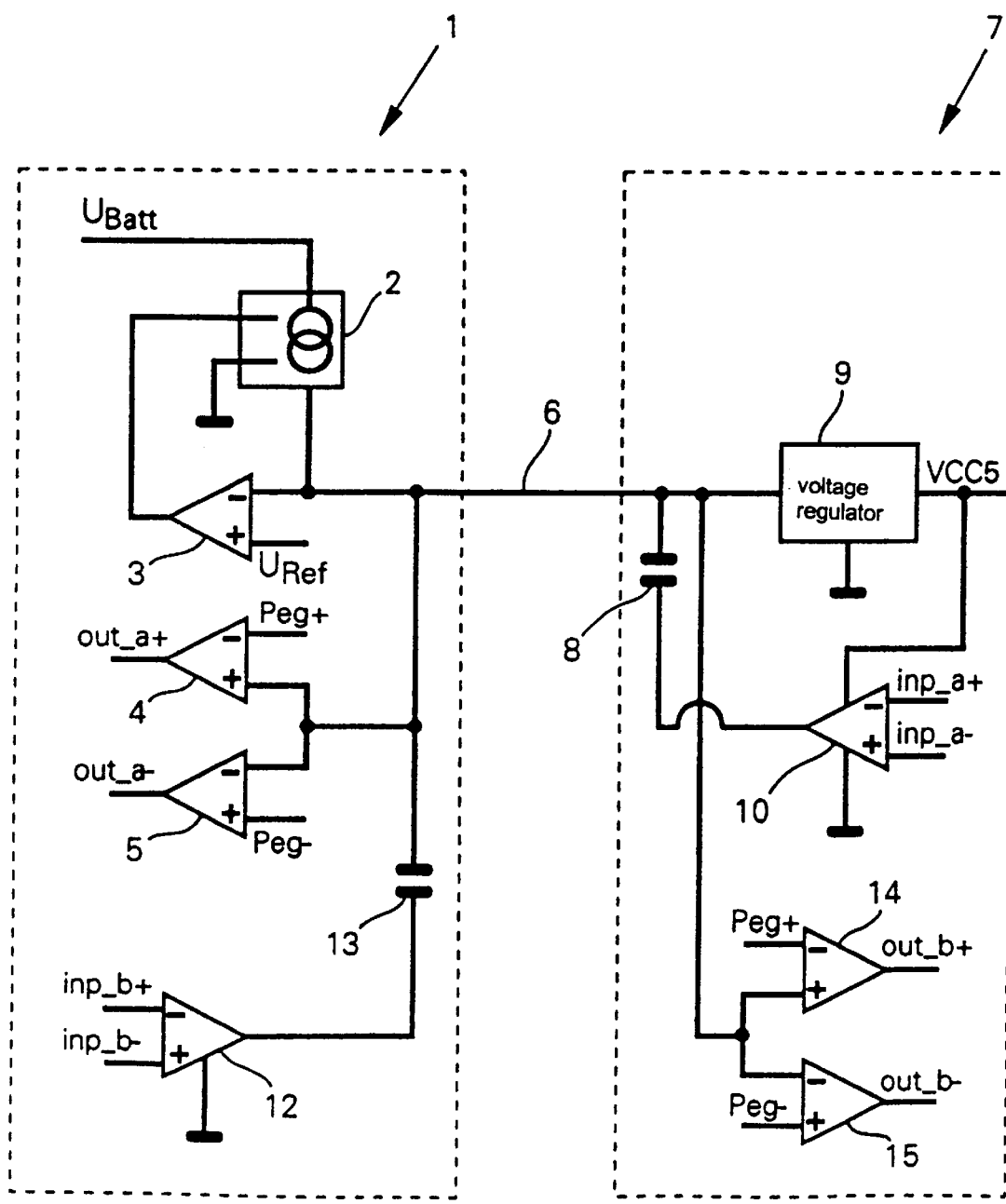
FIG. 2 is a schematic diagram of a second embodiment of the invention.

In the satellite station 7 there are also components such as, for example, sensors, microprocessors and so on which are known per se and which are therefore not shown for reasons of clarity. In addition, a voltage regulator 9 is provided, which is connected at the input end to the data transmission line 6, and at the output end generates the supply voltage (for example 5 V) in a regulated fashion for the components of the satellite station 7. The satellite station 7 is thus supplied with a constant voltage, the power demand of the central station 1 being covered via the line 6. In the satellite station 7 there is a modulator in the form of a current generator 10 with high-pass filter characteristics. The current generator 10 generates the AMI-encoded data that are to be transmitted to the central station according to the inputs at the inp+ and inp– terminals of the current generator 10, as shown in FIGS. 1 and 2. The output of the current generator 10 is connected directly, or preferably via a capacitor 8, to the data transmission line 6. The capacitor 8 connects the bipolar current pulses output at the output of the current generator 10 to the data transmission line 6, with the result that the voltage pulses which are caused by the current pulses are simply added to the quiescent voltage of the data transmission line 6, i.e. the voltage is increased above the quiescent voltage when there is a positive (current) pulse and is reduced below the quiescent voltage (but not below zero) when there is a negative pulse. Because the current generator 2 and the voltage regulator 9 and the output of the modular 10 have high impedance, this superposition of the AMI-encoded data pulses which are to be transmitted takes place without distortion.

If the data which are to be transmitted are to be transmitted by the satellite station 7 in uncoded form, the current generator 10 can be replaced by a broadband current generator.

As is shown further in FIG. 1, the data transmission line 6 is terminated at least at one end, but possibly at both ends, with a characteristic resistance. As a result, a high degree of immunity to electromagnetic interference signals is obtained. This characteristic resistance termination is obtained in the central station 1 and the satellite station 7 respectively by means of a serial RC element 11 which is arranged close (as close as possible) to the respective end of the data transmission line 6, connected between the latter and ground and matched to the characteristic resistance of the data transmission line 6.

FIG. 2 illustrates an exemplary embodiment of a data transmission system in which, in addition to the data transmission from the satellite station 7 to the central station 1 (as in the first exemplary embodiment according to FIG. 1), it is also possible to transmit data in the opposite direction, namely, from the central station 1 to the satellite station 7. The interface is thus configured as a bidirectional interface which permits data to be transmitted in half-duplex mode.

In addition to the components of the central station 1 and of the satellite station 7 which have already been described with reference to FIG. 1, the central station 1 has a current generator 12 which is connected directly, or preferably via a capacitor 13, to the data transmission line 6. The current generator 12 generates the data according to the inp+ and inp– terminal inputs, as shown in FIG. 2, which are to be transmitted from the central station 1 to the satellite station 7, in encoded, preferably AMI-encoded form in the same way as the current generator 10 which has already been described above (for the transmit mode in the opposite direction). The refinement and method of operation which have already been explained with reference to the current generator 10 apply to the current generator 12 in the same way.

The data which have been generated by the current generator 12 in the form of current pulses lead, owing to the high internal resistance of the current generator 2, to correspondingly strong voltage pulses on the data transmission line 6, which are registered in the satellite station 7 by a window comparator 14, 15 and converted. The design and the method of operation as well as the refinement variants of the window comparator 14, 15 correspond to those of the window comparator 4, 5 already described above.

Even if this is not shown, the data transmission line 6 in FIG. 2 can be terminated in the same way as in FIG. 1 using characteristic resistance terminations 11. Here, it is particularly advantageous that, in order to generate data, current generators 10 and/or 12 which have a high-impedance output are used instead of voltage amplifiers, which can also be used. All the components which are connected to the data transmission line 6 thus have high impedance, viewed from the data transmission line 6, with the result that a precise termination with characteristic resistance can be achieved. The circuit according to the invention is suitable for baseband transmission and AMI transmission. Furthermore, the transmission path is matched to broadband requirements. The invention thus provides an interface circuit of novel design for transmitting data between the satellite station 7 and the central station 1, and for supplying power to the satellite station via the same line.

I claim:

1. A data transmission system in a motor vehicle, comprising:

a central station, a satellite station, and a data transmission line connecting said satellite station to said central station for transmitting data therebetween in form of current pulses;

a current generator with low-pass filter characteristics feedback in said central station, said current generator having an output connected to said data transmission line for supplying power to said satellite station via said data transmission line;

a voltage amplifier for regulating said current generator, said voltage amplifier having an input connected to said data transmission line and receiving a voltage reference signal and an output coupled to a control input of said current generator.

2. The data transmission system according to claim 1, which further comprises a current generator in one of said satellite station and said central station for generating current pulses representing data to be transmitted and for superimposing the current pulses on a quiescent voltage present on said data transmission line.

3. The data transmission system according to claim 1, wherein the current pulses representing the data to be transmitted are superimposed on the quiescent voltage with a different sign.

4. The data transmission system according to claim 1, which comprises a window comparator connected to said data transmission line for demodulating a data signal carried on said data transmission line.

5. The data transmission system according to claim 1, which comprises a voltage regulator in said satellite station, said voltage regulator having an input connected to said data transmission line and an output providing a supply voltage for said satellite station.

6. The data transmission system according to claim 1, which comprises a characteristic impedance termination connected at either end of said data transmission line.

7. The data transmission system according to claim 6, wherein the characteristic impedance termination is a serial RC element.

8. The data transmission system according to claim 1, wherein a cutoff frequency of the low-pass control of said current generator is lower than a data transmission frequency by approximately one order of magnitude.

9. The data transmission system according to claim 1, wherein said satellite station is adapted to input the data to be transmitted into said data transmission line in encoded form, and said central station is adapted to demodulate the data received from said data transmission line.

10. The data transmission system according to claim 1, wherein the data are transmitted in AMI-encoded pulses with positive and negative polarities.

11. The data transmission system according to claim 1, wherein said central station and said satellite station are components of a vehicle occupant protection system.

* * * * *